Oct. 14, 1969   E. G. D. RODRIGUES   3,472,414
CONTAINERS AND THE LIKE
Filed Dec. 12, 1966   13 Sheets-Sheet 1
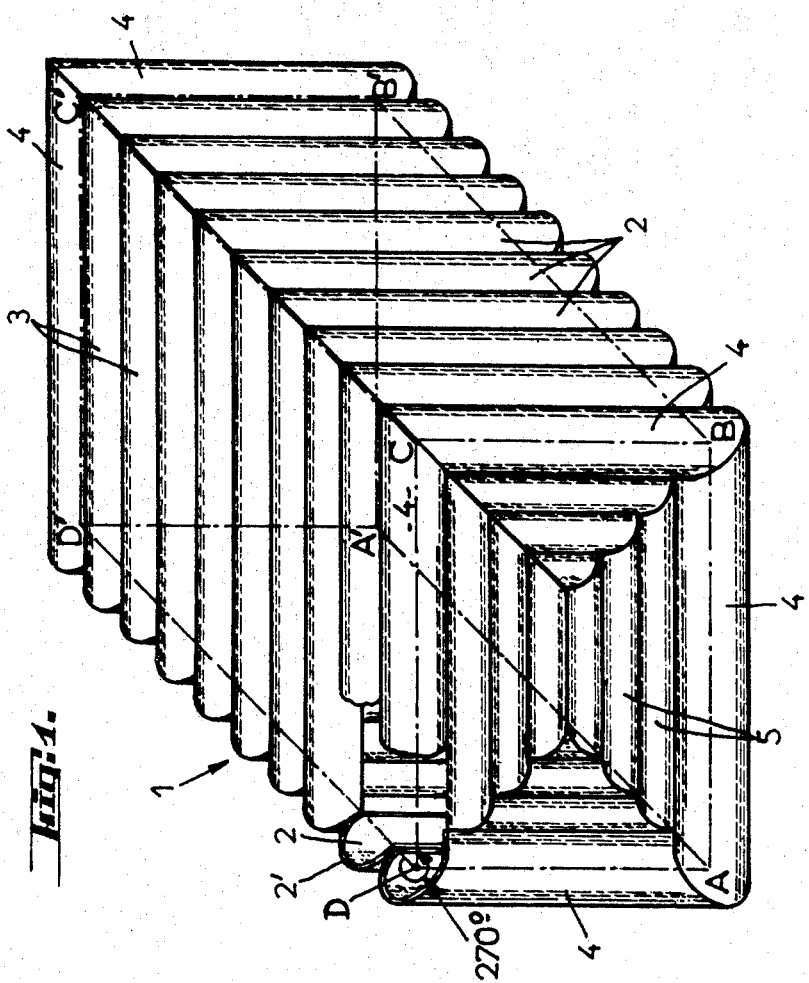
INVENTOR
EDOUARD GEORGES DANIEL RODRIGUES
BY
ATTORNEYS

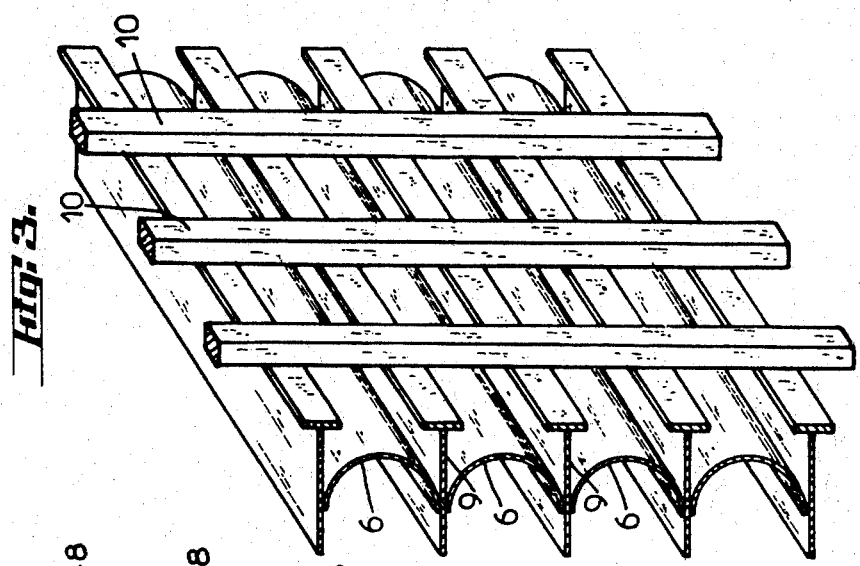
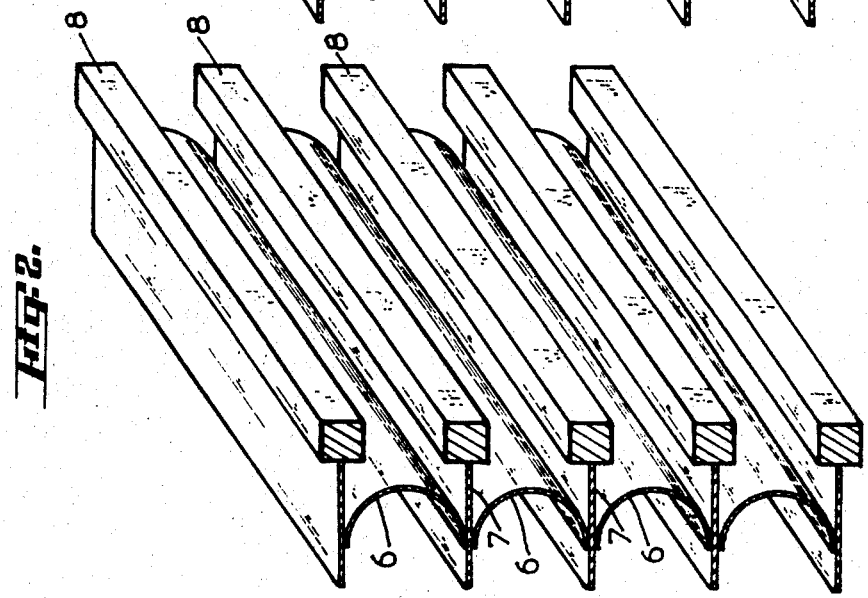
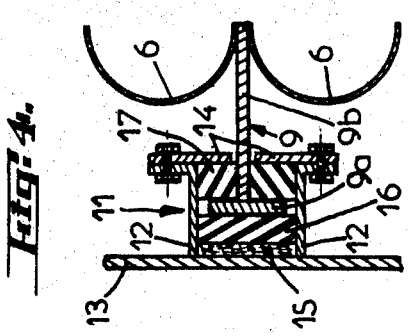

INVENTOR
EDOUARD GEORGES DANIEL RODRIGUES
BY
Kenyon & Kenyon
ATTORNEYS

Oct. 14, 1969     E. G. D. RODRIGUES     3,472,414
CONTAINERS AND THE LIKE
Filed Dec. 12, 1966     13 Sheets-Sheet 4
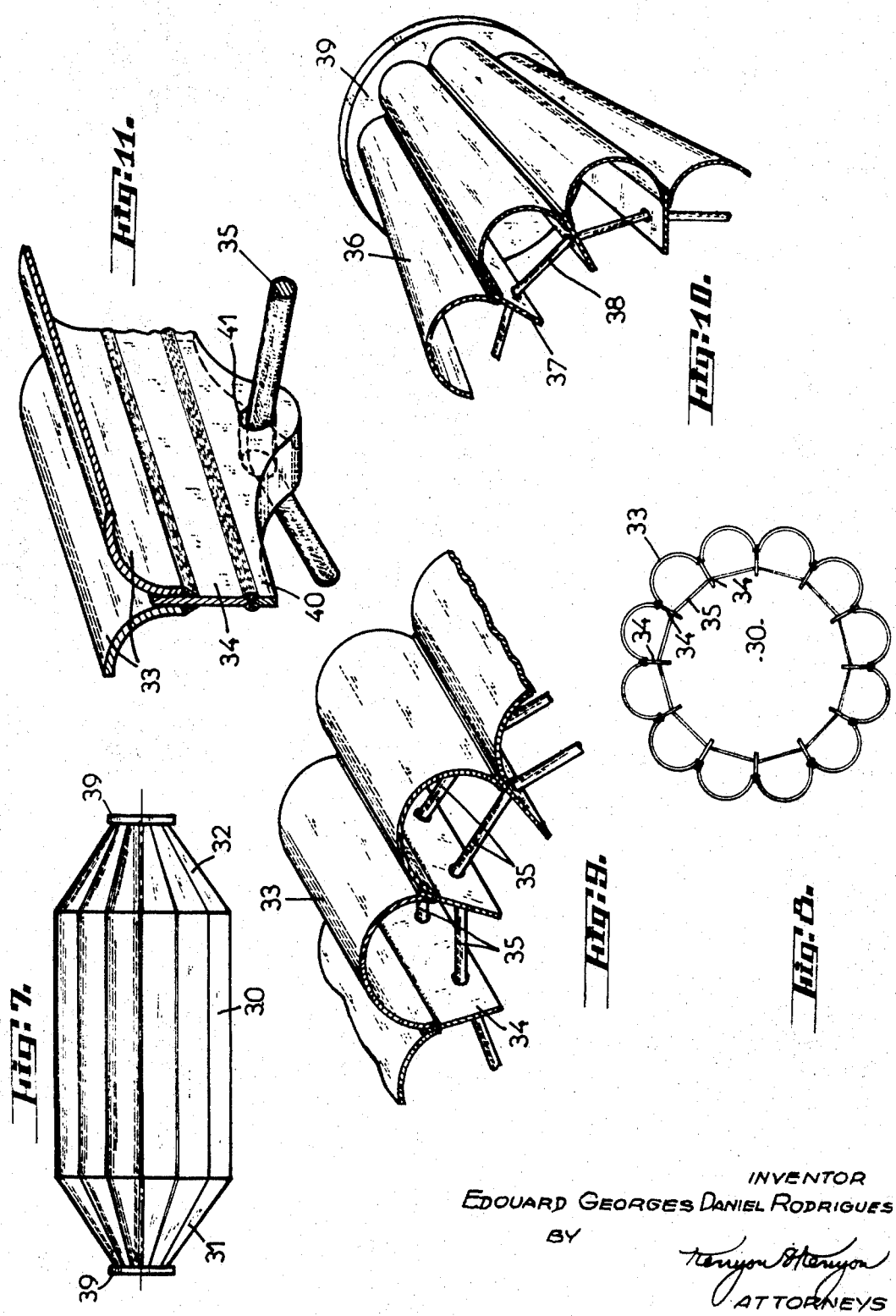
INVENTOR
EDOUARD GEORGES DANIEL RODRIGUES
BY
ATTORNEYS Oct. 14, 1969   E. G. D. RODRIGUES   3,472,414
CONTAINERS AND THE LIKE
Filed Dec. 12, 1966   13 Sheets-Sheet 6
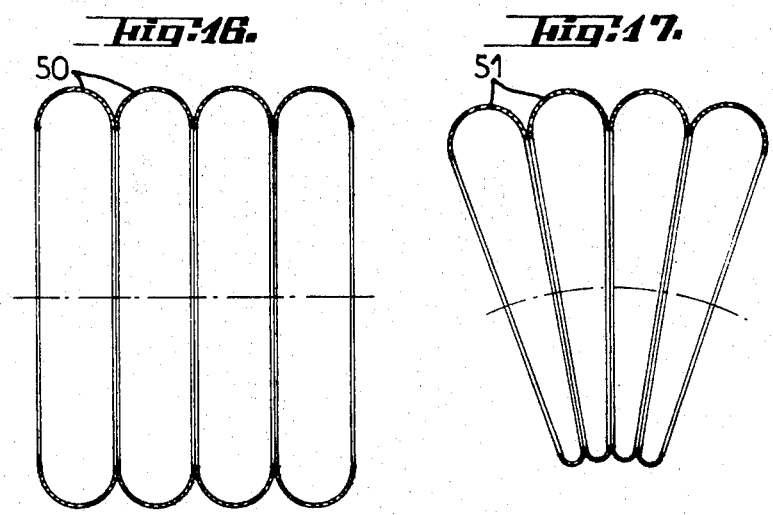
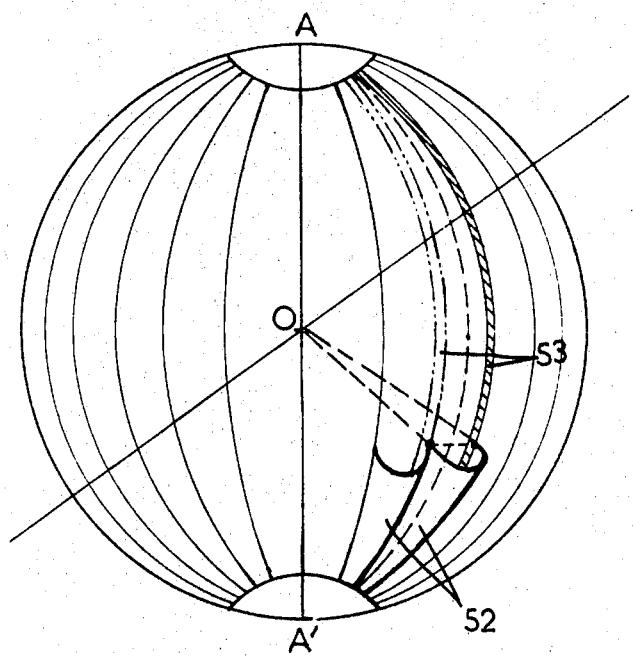
INVENTOR
EDOUARD GEORGES DANIEL RODRIGUE
BY
*Kenyon & Kenyon*
ATTORNEYS Oct. 14, 1969   E. G. D. RODRIGUES   3,472,414
CONTAINERS AND THE LIKE
Filed Dec. 12, 1966   13 Sheets-Sheet 7
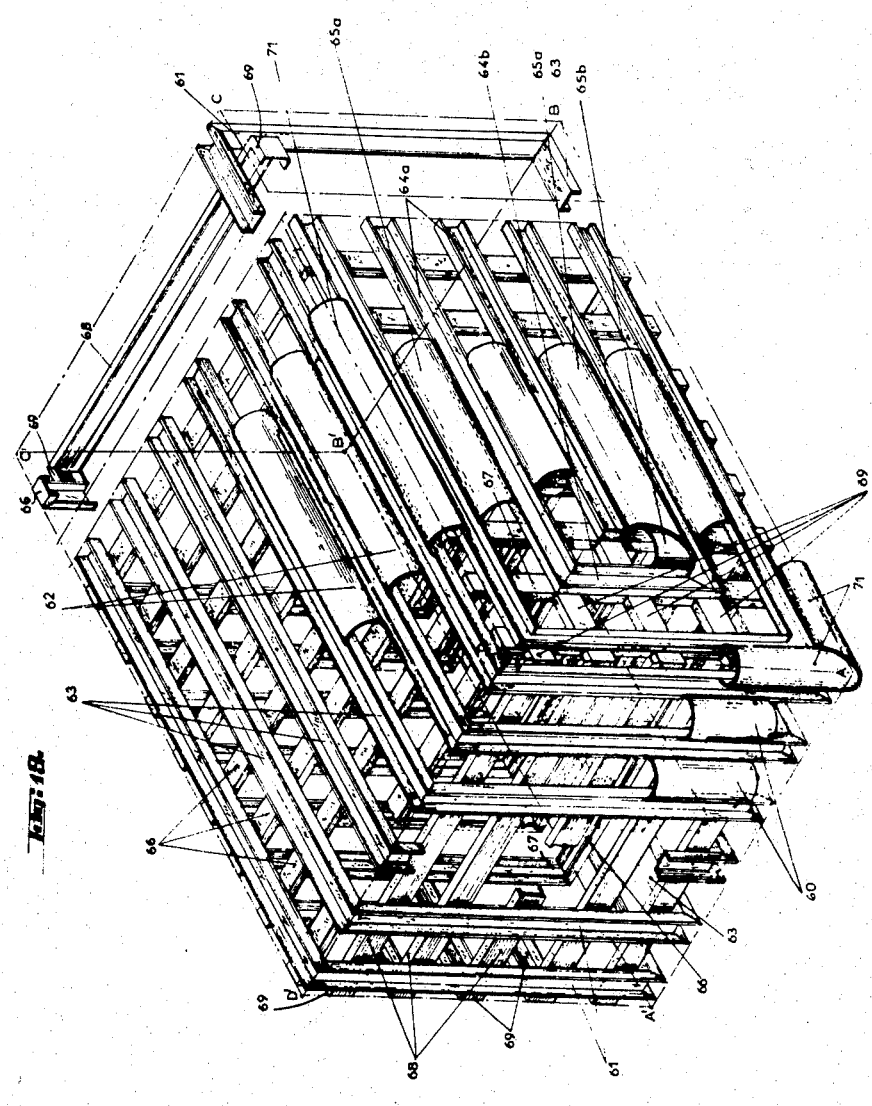
INVENTOR
EDOUARD GEORGES DANIEL RODRIGUES
BY
*Kenyon & Kenyon*
ATTORNEYS Oct. 14, 1969  E. G. D. RODRIGUES  3,472,414
CONTAINERS AND THE LIKE
Filed Dec. 12, 1966  13 Sheets-Sheet 3
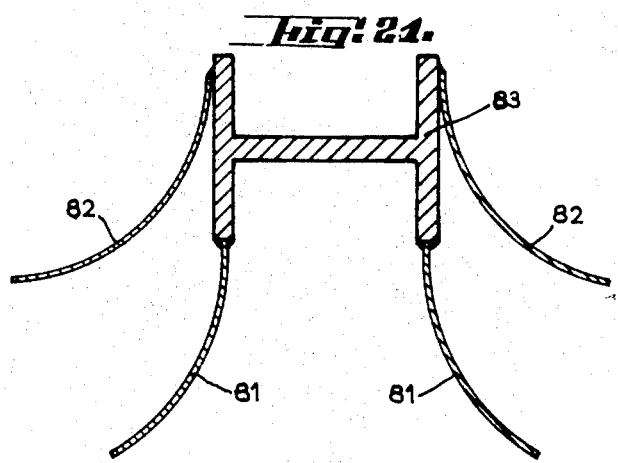
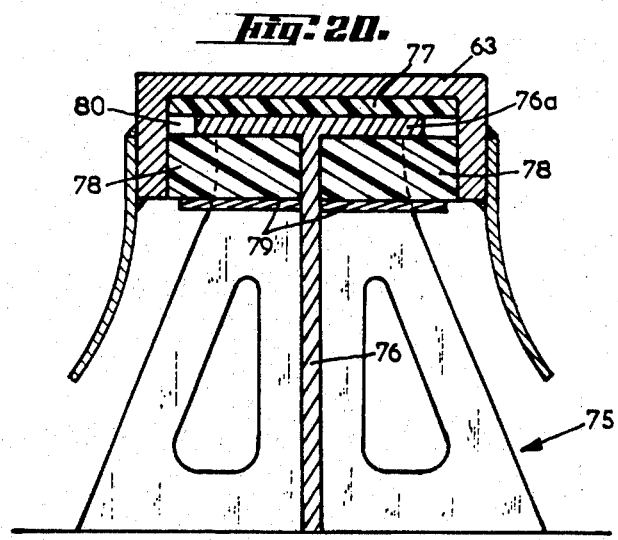
INVENTOR
EDOUARD GEORGES DANIEL RODRIGUES
BY
Kenyon & Kenyon
ATTORNEYS

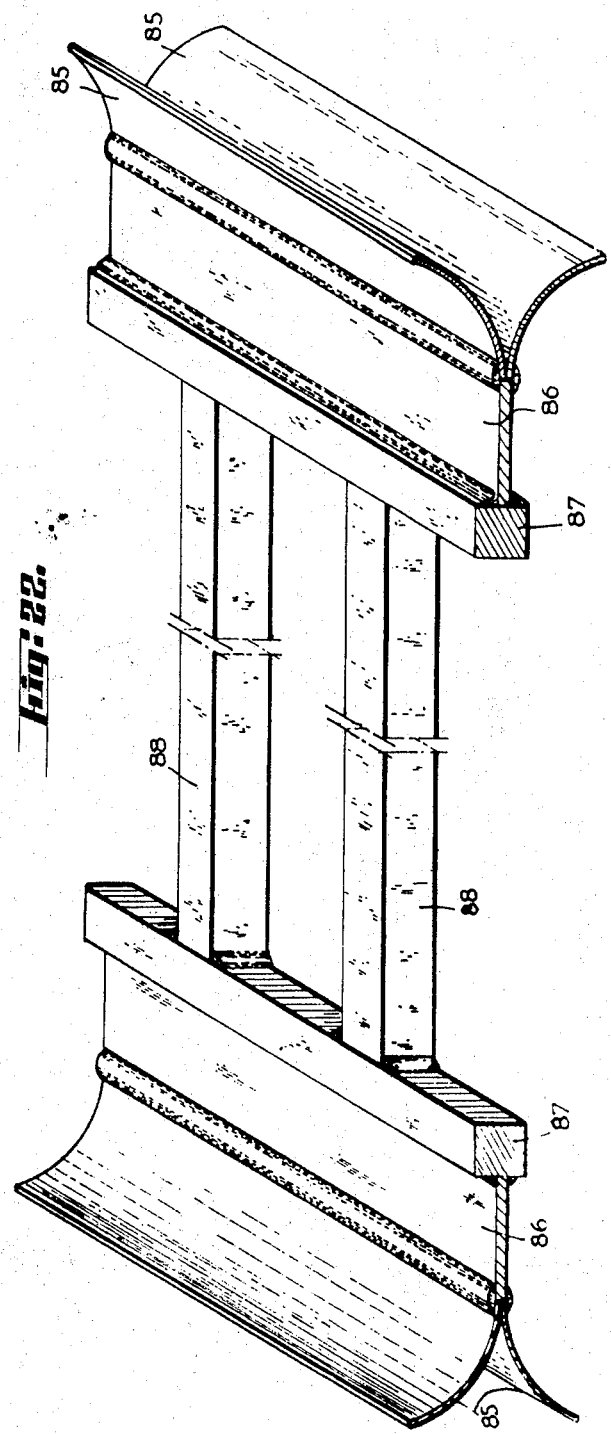
Oct. 14, 1969    E. G. D. RODRIGUES    3,472,414
CONTAINERS AND THE LIKE
Filed Dec. 12, 1966    13 Sheets-Sheet 9
INVENTOR
EDOUARD GEORGES DANIEL RODRIGUES
BY
ATTORNEYS

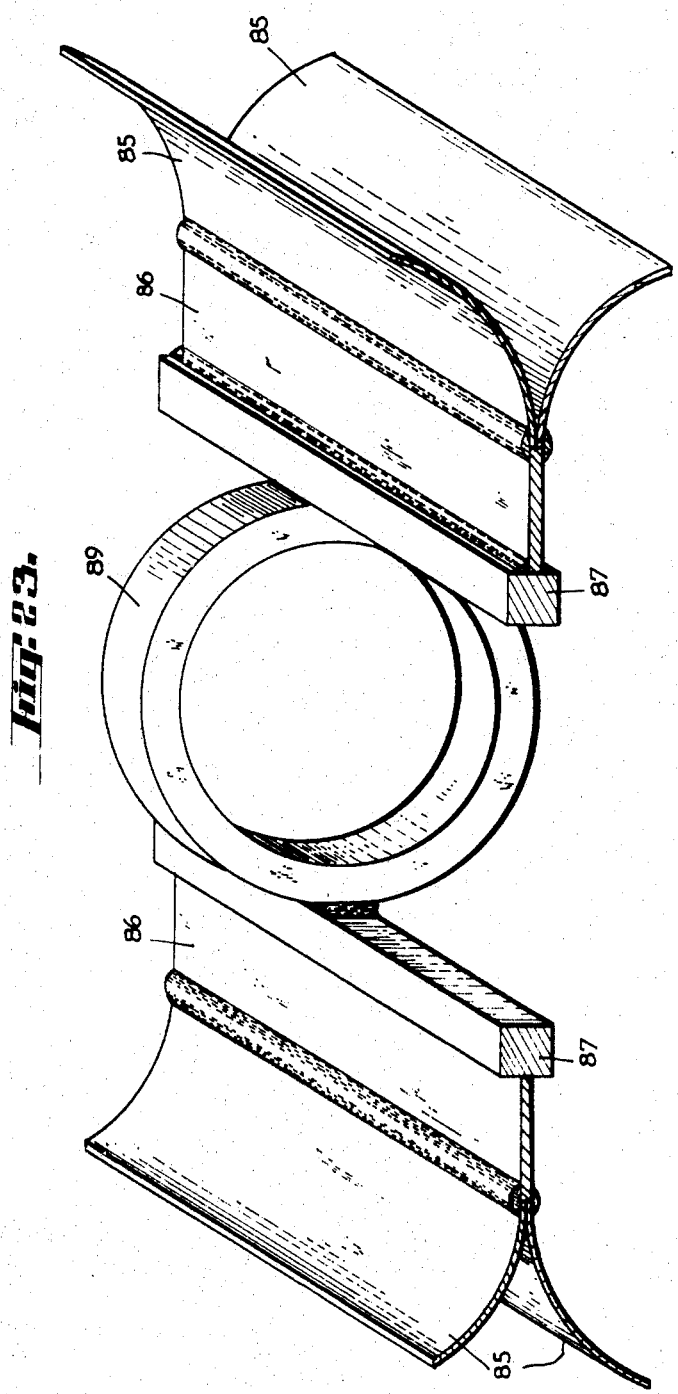

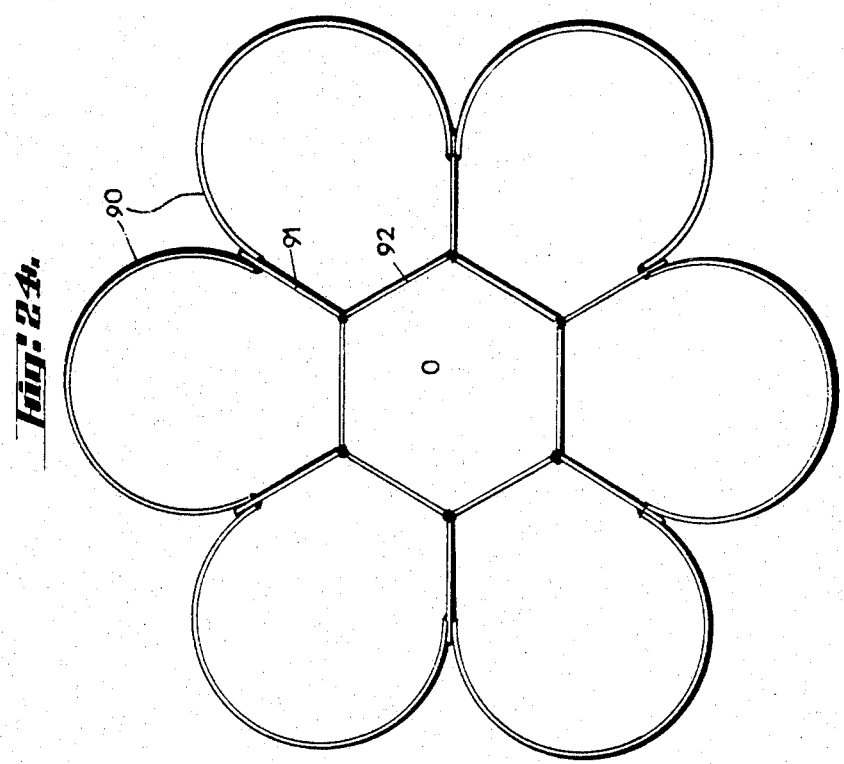

Oct. 14, 1969  E. G. D. RODRIGUES  3,472,414
CONTAINERS AND THE LIKE
Filed Dec. 12, 1966  13 Sheets-Sheet 12
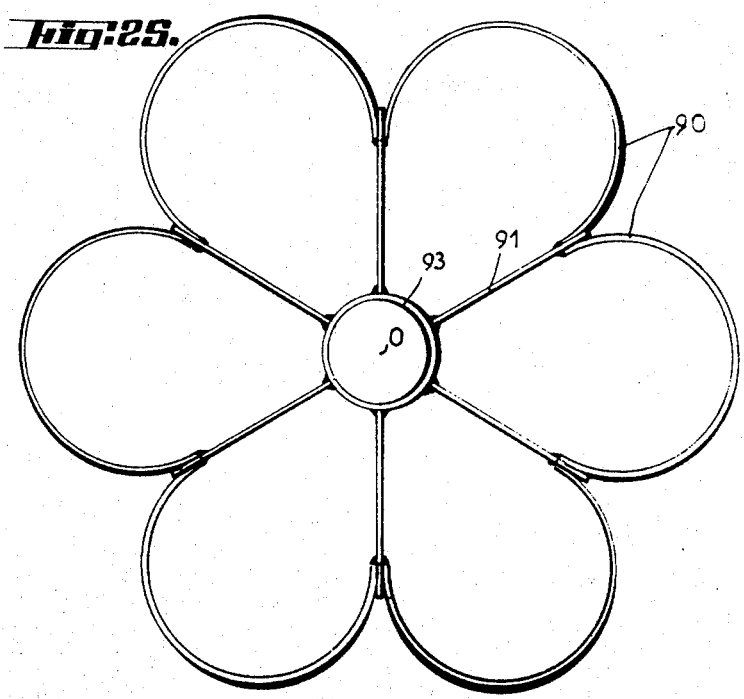
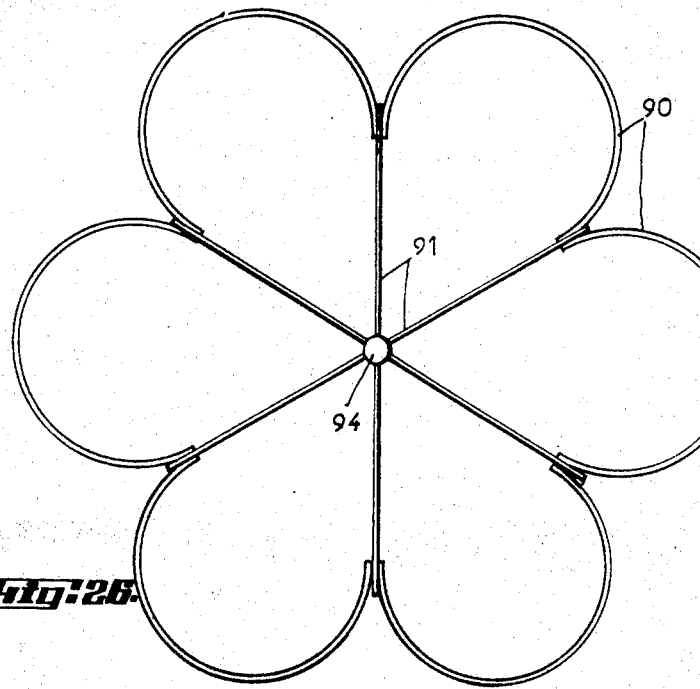
INVENTOR
EDOUARD GEORGES DANIEL RODRIGUES
BY
ATTORNEYS

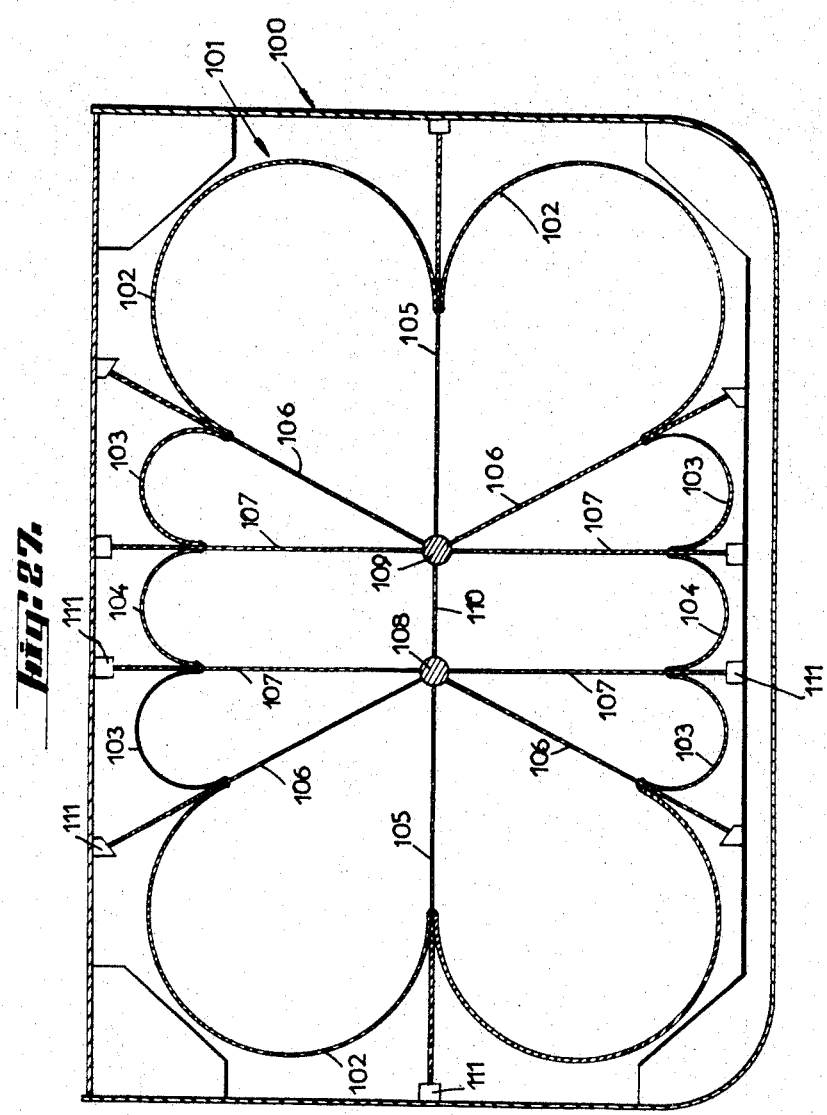

United States Patent Office 3,472,414
Patented Oct. 14, 1969

3,472,414
CONTAINERS AND THE LIKE
Edouard Georges Daniel Rodrigues, La Ciotat, France, assignor of one-half to Chantiers Navals de la Ciotat, La Ciotat, Bouches-du-Rhone, France, a French company
Filed Dec. 12, 1966, Ser. No. 600,843
Claims priority, application France, Dec. 16, 1965, 42,534; Mar. 10, 1966, 52,947; Apr. 26, 1966, 59,174
Int. Cl. B65d 11/02, 11/14, 11/22
U.S. Cl. 220—3
3 Claims

ABSTRACT OF THE DISCLOSURE

A container comprising a shell of sheet material consisting of an assembly of lobes. The lobes may have the shape of portions of cylinders, of frustums of cones, of portions of tores, of spherical lunes inscribed on a same sphere. The lobes are connected to each other tangentially along their side edges with an intermediate connecting element interposed between any two such side edges. Stiffening means engaged said intermediate connecting elements and take up the stresses to which the lobes are submitted.

---

The present invention essentially relates to containers, tanks, vats or like vessels, adapted to contain any product, for example a gas under pressure, a liquid at any temperature or again some powdery material.

Presently, tanks, containers or like vessels are used for the storage and transportation of solid, liquid or gaseous products, which containers exhibit very various shapes, such as for example containers in the shape of parallelepipeds, circular cylinders, spheres etc.

Such containers or the like are made by means of metal sheets joined for example through welding, these metal sheets being substantially plane in the case of parallelepipedic tanks or in the shape of cylinder portions or sphere portions in the case of cylindrical or spherical tanks, these cylinder or sphere portions having each one the same radius which is that of the whole cylinder or sphere.

One has been led to use, for the manufacture of the envelope or shell of these containers or the like, metal sheets of more or less significant thickness, according to the stresses which are applied thereto by the materials to be contained therein.

In the case of very high pressures, for example for the transportation or storage of a liquefied gas, vats or containers are used mainly in the shape of circular cylinders or spheres, which particularly well withstand high pressures, and even it is however necessary to design the walls of these containers with very great thicknesses to enable them to withstand the high stresses they have to undergo.

Such containers therefore exhibit an excessive dead weight entailing a substantial expense of material and considerable drawbacks when they are containers adapted for transportation purposes. Moreover, in this latter case, the cylindrical or spherical shape involves very substantial space losses, so that the transportation means provided with such containers, for example methane conveying ships, have a relatively small conveying capacity with repect to their size. Finally, it is not possible, with the present state of the art, to make use of metal sheets having too great a thickness, thereby resulting in the limitation of the radius which may be given such cylindrical containers, hence their volume.

It has already been suggested to build so-called multi-lobular tanks, that is containers the envelope of which consists of a plurality of intersecting arcs of circles, connecting along their common generating line. Such containers, which have only a very restricted number of lobes, are made indeed by juxtaposition of conventional cylindrical tanks, i.e. containers each of which is formed with a cylindrical shell with a relatively great radius, which is closed at its ends by a spherical wall or bottom for example, connected to said cylindrical shell. Such a mode of manufacture does not involve any decrease in the thickness of the metal sheets; on the other hand, it assigns to the container a general given shape, from which it should not be departed.

One object of the container according to the invention is to avoid the drawbacks mentioned hereinabove and it is particularly characterized in that it consists of a lobe assembly made for example of steel sheets and formed by portions of cylinders, of frustums, of cones, or of tores the directrix of which is an arc of a circle of an ellipse, of a basket-handle arch, etc., or even a lobe assembly having the general shape of spherical lunes inscribed on a same sphere, such lobes having as directrices homothetic arcs of circles, of ellipses, of basket-handle arches, etc., these lobes being juxtaposed two by two along a same generating line, in the case of cylinders or of frustums, of cones, or along a same circle in the case of tores and being made integral with each other along said generating lines or said circles and by means of stiffeners connected to said junction areas and arranged inside and/or outside of said tank.

The construction of container walls according to the invention, i.e. in the shape of a plurality of elements of circular, elliptic or any other section, connected with each other, enables to substantially decrease their thickness with respect to a container built according to a conventional method and subjected to the same stresses. It results therefrom substantial savings in material and therefore, a substantial reduction in weight and manufacturing costs. Moreover, it is possible to make containers having a predetermined volume, even when very important, without being limited by the thickness of the metal sheets.

Such containers being able, for a given material thickness to bear pressures very much higher than the conventional containers, it is no longer necessary to exclusively limit oneself, in the case of very high pressures, for example, to containers of generally cylindrical or spherical shape. It is therefore possible, in the case of tanks or vessels to be mounted on ships for the transportation of liquefied gases, products for example, to make the shape of these containers fit to that of the holes, hence using the maximum space available on board ship.

The aforesaid wall elements may have the shape of cylinders, two adjacent cylinders being juxtaposed along a common generating line or even the shape of frustums of a cone, a pair of adjacent frustums of a cone being juxtaposed along a common generating line.

The aforesaid elements may have the shape of torous portions, two adjacent torous portions being juxtaposed along a circle at right angles to their center line.

The aforesaid elements may still have the shape of spherical lunes inscribed on a same sphere, two adjacent spherical lunes being juxtaposed along an arc of a circle or of an ellipse located in a plane passing through the polar axis of said sphere.

Other features and advantages of the invention will appear as the following description proceeds with reference to the accompanying drawings only given by way of example and wherein:

FIGURE 1 diagrammatically shows a container of generally parallelepipedic shape according to the invention;

FIGURE 2 is a perspective view diagrammatically showing external stiffener means used with a container of the type shown on FIGURE 1 and accommodated within a rigid structure;

FIGURE 3 is a perspective view diagrammatically showing an alternative embodiment of the aforesaid stiffener means;

Figure 5:
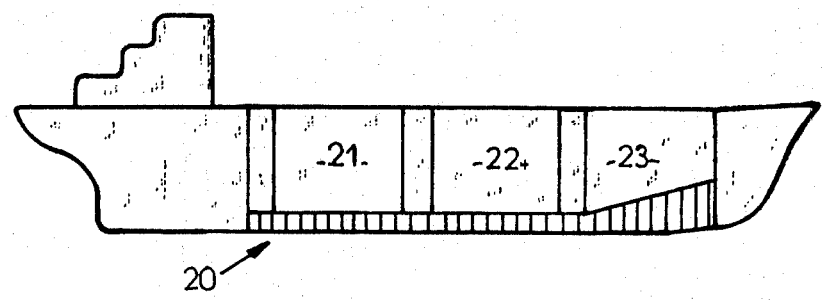
Figure 6:
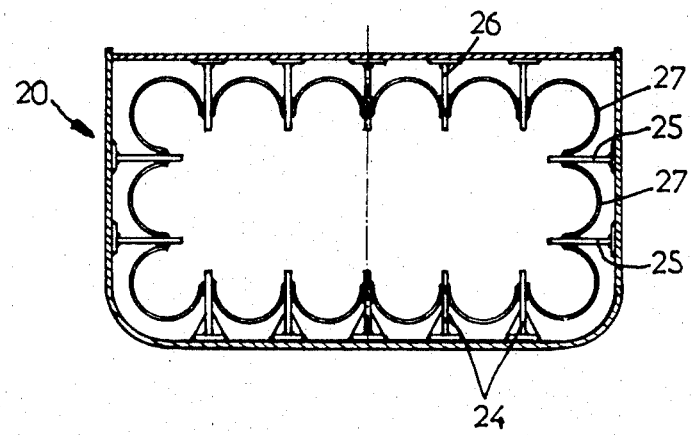
Figure 13:
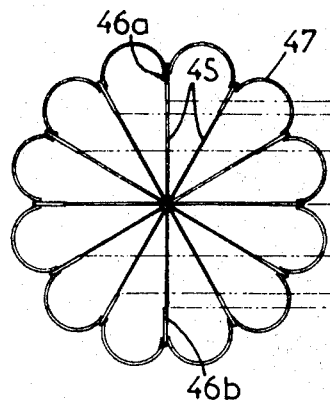
Figure 14:
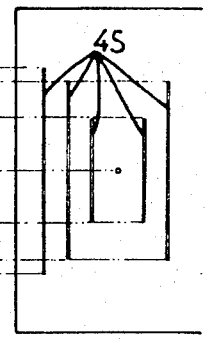
Figure 15:
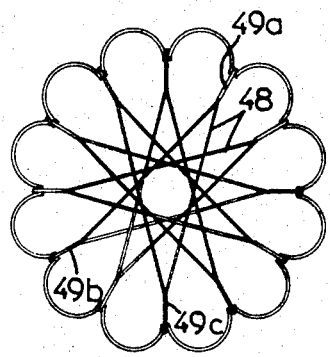
Figure 12:
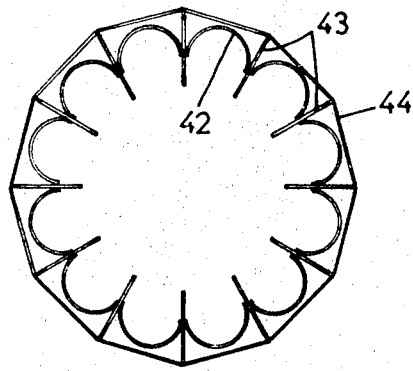

FIGURE 4 diagrammatically shows an embodiment of the outer stiffeners for a container likely to be subjected to a partial vacuum;

FIGURE 5 diagrammatically shows a ship with three holds adapted for the transportation of liquefied gas;

FIGURE 6 is a sectional diagrammatic view of a tank of a generally parallelepipedic shape, according to a modification of the invention, this tank being integrated into the hull of a ship, such as the ship of FIGURE 5;

FIGURE 7 diagrammatically shows a tank more especially adapted for storage and formed with a central body of general cylindrical shape and with two end portions in the shape of frustums of a cone;

FIGURE 8 is an end view of the cylindrical body of the tank of FIGURE 14, provided with inner stiffening cables;

FIGURE 9 is a perspective view diagrammatically showing a portion of the cylindrical body of the tank illustrated in FIGURE 7;

FIGURE 10 is a perspective view diagrammatically showing a portion of one of the frusto-conical parts of the tank illustrated in FIGURE 7;

FIGURE 11 is a partial view of a container having a general shape of revolution and showing a mode of attachment of the inner stiffening cables;

FIGURE 12 diagrammatically shows a sectional view of a container of general cylindrical shape, provided with outer stiffening cables;

FIGURE 13 diagrammatically shows the sectional view of a container having a general cylindrical shape and provided with radially arranged stiffening cables;

FIGURE 14 is a diagrammatic transverse view of the container of FIGURE 13, showing the distribution of the stiffening cables;

FIGURE 15 diagrammatically shows the sectional view of a container having a generally cylindrical shape and provided with stiffening cables according to an alternative embodiment;

FIGURE 16 diagrammatically shows a partial view of a tank consisting of juxtaposed torous portions;

FIGURE 17 diagrammatically shows a fragmentary view of a container made up from juxtaposition of lobes, having the shape of tores of variable sections;

FIGURE 18 diagrammatically shows a fragmentary view of a spherical tank consisting of juxtaposed spherical lunes;

FIGURE 19 is a fragmentary perspective view, with parts partially broken away, of a container according to an embodiment of the invention;

FIGURE 20 is a fragmentary sectional view of the lower wall of the container, showing the supporting arrangement for said container;

FIGURE 21 is a partial sectional view of a double-walled container, provided with structural beams having an H-shaped cross-section.

FIGURE 22 is a diagrammatic perspective fragmentary view of a tank provided with connecting elements and stiffeners according to an embodiment of the invention;

FIGURE 23 is a diagrammatic, fragmentary perspective view of a container, showing an alternative embodiment of the stiffeners;

FIGURE 24 is a diagrammatic end view of a container element or portion of a general cylindrical shape, the stiffeners of which are plates connected to an inner structural member;

FIGURE 25 is a view similar to that of FIGURE 24, but relating to a first modification;

FIGURE 26 is a view similar to that of FIGURE 24, but relating to a second modification;

FIGURE 27 is a diagrammatic end view of a container of general parallelepipedic shape according to the invention, located within a rigid enclosure.

In practice, it is possible to make a container according to the invention by juxtaposing cylindrical, frusto-conical or toroidal lobes, by making them integral with each other, for example through welding, along their connecting line and by providing stiffening means for taking up the stresses to which the lobes are subjected.

These lobes may be made from usual or special steel sheet, aluminum sheet or from any other metal. They may also be made from plastic materials or the like, or even from composite materials such as a mixture of glass fibers and resins.

The stiffening means may be provided inside of the container and connect to each other two connecting areas, that is two connecting areas located in a same plane and subjected to stresses of opposite directions. These stiffening means would be made from solid plates, cut away plates, beams, or even from wire-ropes or cables and be made from steel, aluminum or from any other metal, or even from plastic material.

FIGURE 1 shows an embodiment of a tank 1 according to the invention having the general shape of a rectangular parallelepiped ABCDA'B'C'D'.

In this embodiment, each one of the flat walls of the parallelepiped is made by juxtaposition of lobes having the shape of semi-circular cylinders of the same radius, arranged in parallel relation to the edges of the parallelepiped.

The vertical faces AA'DD' and BB'CC' consist of lobes 2 the generating lines of which are vertical and which may be joined to each other by stiffeners of any kinds, for example by beams or cables arranged inside of the tank in parallel relation to AB. These stiffeners have not been shown on FIGURE 1 for the sake of clarity of the drawing.

Likewise, the horizontal faces ABA'B' and CDC'D' consist of lobes 3 the generating lines of which are parallel to AB and which are connected to each other by metal sheets, beams or cables (not shown) inside the tank and parallel to BC.

Each lobe 2 is cut off at both of its ends such as 2' along planes making an angle of 45° with the faces DD'C'C, AA'D'D, so as to enable the connection with the corresponding lobe 3 of the horizontal faces DD'C'C and AA'B'B, itself cut off along the same plane.

The edges of the parallelepiped consist of lobes 4 which, instead of being semi-circular as the lobes 2 and 3 of the plane walls, exhibit an aperture of 270°.

Finally, the faces ABCD and A'B'C'D' consist of lobes 5 the generating lines of which are parallel to the plane ABCD, but which are parallel to AB from AB and from CD and are parallel to BC from BC and from AD. These lobes, contrary to lobes 2 and 3 forming the other faces of the parallelepiped have an equal length, their length decreasing with a decreasing distance to the center of the face ABCD. These lobes 5 may be connected to each other by metal sheets, beams and cables (not shown) inside the tank and parallel to AA'.

In the case where a container is adapted to be accommodated within any rigid structure, for example inside a ship's hull, the stiffening means may consist of spacers, beams or the like, arranged outside of this tank and bearing upon said structure.

FIGURE 2 partially and diagrammatically shows a tank the lobes 6 of which, for example in the shape of semi-circular cylinders the concavity of which is facing towards the inside of the tank, are welded two by two to a same connecting plate 7 projecting outside from the tank. These connecting plates 7 are bearing against supporting beams 8 for example made from steel, cement or any other material, extending parallel to the plates 7 and being part of the aforesaid rigid structure (not shown) or integral with the latter.

According to the embodiment illustrated in FIGURE 3, the connecting elements 9 between two lobes 6 consist of sectional bars having a T-shaped cross-section and bearing against the supporting beams 10 extending at right angles to the connecting elements 9 and also being a part of the rigid structure or integral with the latter.

These outer stiffeners may also be combined with inner stiffeners of the aforesaid type.

The tanks containing certain materials under pressure, for example a liquefied gas, may be subjected, at least temporarily, during unloading for example, to a partial vacuum. These tanks therefore must be designed to withstand not only the stresses imposed by the material they enclose but also the stresses exerted by the atmospheric pressure.

FIGURE 4 partially and diagrammatically hows an embodiment of outer stiffeners for a tank having any general shape and adapted to be subjected to both the pressure of the materials contained therein and a partial vacuum. Each connecting element 9 between two adjacent lobes 6 consists, as in the case of FIGURE 3, of a sectional T-shaped bar the portion 9a of which is located within a connecting member 11, made of sectional L-shaped bars 12, integral with a wall 13 of the rigid structure and with connecting plates 14 leaving therebetween a space for the passage of the portion 9b of the sectional bar 9. The portion 9a of the sectional bar bears upon the wall 13 through the medium of a rigid packing piece 15, for example made of wood, and of a first resilient pad or the like 16 and upon the closure plates 14 through the medium of a second resilient pad 17, these pads 16 and 17 being made of rubber for instance.

For such tanks, cables or the like could be used which are anchored on the one hand to the connecting element and on the other hand to the wall of the rigid structure or to a member of this structure, these cables sustaining traction when the tank is subjected to a partial vacuum.

In FIGURE 5 has been diagrammatically illustrated a ship 20 adapted for example to the transportation of liquefied gas and comprising holds such as 21 and 22 of a generally parallelepipedic shape and a hold 23 at the bow of the ship, having substantially the shape of a frustum of a pyramid.

The tanks accommodated within these holds must occupy the greatest possible volume, so that one is led to give them the very shape of the holds which are to receive them. In the holds 21 and 22 will be placed for example tanks of parallelepipedic shape, such as the tank shown on FIGURE 1 and provided with the inner stiffening means.

In the fore hold 23 could be accommodated for example a tank in the shape of a frustum of a pyramid constructed, save in the shape, as the tank of FIGURE 1 and also provided with inner stiffeners.

The vessels described hereinabove, being located inside the holds of the ship, i.e. inside a rigid structure, outer stiffeners may be used instead of inner stiffeners. In this case, the connecting plates between two adjacent lobes are projecting outside from the tank as in the case shown on FIGURES 2 and 3 and are bearing either upon beams or spacing members inserted between the tank in the hull, or upon the main frames of the hull. In the case of containers conveying a gas under pressure and therefore incurring the risk of being subjected to a partial vacuum, a connecting system, such as illustrated in FIGURE 4, is advantageously provided.

As stiffening elements, use may also be made of the main frames of the hull, that is the keelsons 24, the stringers 25, and the coamings 26, upon which are welded the lobes 27 forming the tank, as shown on FIGURE 6. In this case, an integrated tank is achieved. It should be noted that such an integrated tank enables to dispense with the double bottom of the ship.

It should also be noted that owing to its construction proper, an integrated tank not only withstands pressures exerted by the material it contains but also a partial vacuum.

In FIGURE 7 has been illustrated a storage tank consisting of three main parts, namely a central part 20 in the shape of a cylinder and two side parts in the shape of frustums of a cone 31 and 32. The central portion 30 is made up by the juxtaposition of identical cylindrical lobes 33, tangentially connected to flat connecting sheets 34, to each of which they are secured as by welding (see FIGURES 8 and 9). The stiffeners consist of cables 35 connecting the sheets 34 to each other and therefore arranged inside of the tank.

Also, the frusto-conical portions 31 and 32 of the tank are made up by the juxtaposition of lobes 36 in the shape of frustums of a cone, all identical to each other and tangentially connected to flat connecting sheets 37 to which are tangentially connected two adjacent lobes (see FIGURE 10). The stiffeners consist of cables 38 connecting the sheets 37 to each other.

The ends of the frusto-conical portions of the tank consist of flat plates 39 of circular shape, to which are connected on the one hand the frusto-conical lobes 36 and on the other hand the connecting sheets or strips 37. The connection between the cylindrical lobes 33 and the conical lobes 36 may be achieved by means of intermediate spherical lobes, tangent both to lobes 33 and to lobes 36 and welded to these lobes. Likewise, the connection between the lobes 36 and the plate 39 may be achieved by means of intermediate lobes in the shape of conoids welded to said lobes and to said plate. This connection through spherical lobes or in the shape of conoids enables to dispense with angular points on the tank.

FIGURE 11 shows a preferred embodiment of the attachment of the stiffening cable, such as the cables 35 for example. On each connecting sheet or strip 34 is welded a molded piece 40 provided with a hole 41 through which extends the stiffening cable 35 arranged on the inner periphery of the tank.

Many modifications and changes may be made to the embodiments shown and described herein without departing from the scope of the invention. Thus for example instead of using as stiffeners, inner peripheral cables, outer peripheral cables may be used.

FIGURE 12 shows a tank of cylindrical form, consisting of lobes 42 joined two by two by connecting sheets or strips 43 which project outside from the tank and are connected to each other by outer peripheral cables such as 44.

According to the embodiment illustrated in FIGURES 13 and 14, the stiffening cables 45 are arranged inside of the tank and connect two diametrally opposed connecting sheets or straps, such as 46a and 46b, to each other. To avoid the crossing of these cables in the center of the tank, the cables are staggered or offset with respect to each other, as is shown on FIGURE 14. This embodiment may be used when the tank comprises an even number of lobes 47.

Finally, FIGURE 15 shows a further alternative embodiment wherein the stiffening cables 48 interconnect a connecting sheet or strap such as 49a with two sheets or straps such as 49b and 49c, i.e. with two sheets or straps substantially in front thereof but not diametrically opposed thereto. Such an embodiment is besides applicable to a tank comprising an even number of lobes and is more particularly adapted to tanks comprising an odd number of lobes.

It should be noted that the various systems of stiffening cables, illustrated in FIGURES 8 through 15, may be used with tanks of generally cylindrical shape as well as for tanks of generally conical or spherical shape.

In the case of cylindrical conical or spherical tanks, adapted to undergo a partial vacuum, either an outer stiffening system may be provided or rigid stiffeners or floating rings or the like, upon which abut the connecting sheets when the tank is subjected to a depression, may be provided inside the tank.

A tank according to the invention may also be achieved by the juxtaposition of lobes 50 in the shape of annulus portions (FIGURE 16), these annulus possibly having as generating curves, circles of the same radius or of differing radii or even ellipses, and possibly having equal or gradually variable equatorial circles.

A tank according to the invention may also be made by juxtaposition of lobes 51 which are in the shape of annulus portions of which the radius of the generating circle would vary periodically during its rotation, so as to obtain the pattern shown in FIGURE 17. The juxtaposition of such lobes would enable to achieve a tank of generally toroidal shape.

Finally, FIGURE 18 illustrates a tank having the general shape of a sphere and consisting of juxtaposed lobes 52 in the shape of equal spherical lunes, each spherical lune having, in section by a plane passing through the center O of the square and extending at right angles to the polar diameter AA', the shape of an arc of a circle and being connected to the adjacent lobes by connecting sheets 53. These spherical lunes could be given differing opening angles and each lobe could be given a shape such that its section by the aforesaid plane is not an arc of a circle but any one curve such as an arc of an ellipse, of even an arc of a basket-handle.

Although the various tanks described and shown by way of examples consist of lobes the concavity of which is facing inwards, it is obvious that tanks may also be constructed the lobes of which have their concavity facing outwards. Such a construction is particularly advantageous when it is concerned with tanks to be subjected to a relatively small inner pressure and to a relatively high outer pressure, which is the case for example of evacuated tanks or of submerged tanks.

According to the embodiment illustrated in FIGURE 19, the tank according to the invention, adapted for the transportation of liquefied gas at atmospheric pressure, has the general shape of a rectangular parallelepiped ABCD, A'B'C'D'.

In FIGURE 19, the walls AA'DD'; DD'CC'; CC'BB'; and BB'AA' are held to be the peripheral walls and ABCD and A'B'C'D' the end walls.

In this embodiment, each one of the flat walls of the parallelepiped is constituted by the juxtaposition of lobes in the shape of semi-circular cylinders of the same radius arranged parallel to the edges of the parallelepiped.

The vertical faces AA'DD' and BB'CC' consist of lobes 60 the generating lines of which are vertical and which are integral with connecting elements consisting of U-shaped beams or the like 61 the opening of which is directed towards the outside of the tank. Along both parallel flanges of each beam 61 are welded two successive lobes 60.

Likewise, the horizontal faces ABA'B' and CDC'D' consist of lobes 62 the generating lines of which are horizontal and which are integral with U-shaped beams 63.

The beams 61 of the vertical face AA'DD' are confronting the corresponding beams of the face BB'C'C, and, likewise, the beams 63 of the horizontal faces ABA'B' and CDC'D' are confronting each other and these beams 63 have their ends connected to the ends of the beams 61, so that the four beams 61 and 63 form together a rigid frame.

Each lobe 60 may be cut off at both its ends, along planes making an angle of 45° with the faces DD'CC' and AA'BB', as has been stated hereinabove, so as to enable the connection with the corresponding lobe 62 of the horizontal faces DD'CC' and AA'BB', itself cut off along the same plane. The connection of these lobes may be also effected by means of sheet parts in the shape of a quarter of a sphere.

The faces ABCD and A'B'C'D', which constitute the front faces of the parallelepipedic tank, consist of beams 64a, 64b which, instead of having a single direction as the beams 61 and 63 of the vertical and horizontal faces of the tank, exhibit two perpendicular directions and form homothetic rectangles the sides of which are parallel to the edges AB and AD of the tank. These beams 64a, 64b have their ends cut off at 45° and are connected to each other by said ends, so that the four beams forming a rectangle have their webs, that is their faces forming the transverse leg of the U, located in a same plane.

On the beams 64a, 64b, are secured lobes 65a, 65b, the lobes 65a having their generating lines parallel to AB whereas the lobes 65b have their generating lines parallel to AD. These lobes 65a, 65b contrary to the lobes 60 and 62 forming the remaining faces of the parallelepiped, exhibit unequal lengths, their lengths decreasing as the distance to the center of the face ABCD decreases. These lobes are of course cut off their ends at 45° as the beams 64a, 64b on which they are mounted, so as to permit of being connected to each other. The connection between two lobes is preferably achieved by means of a connecting member consisting for example of a round iron or keeper welded to the edges of both lobes.

Finally, the edges of the parallelepiped consist of lobes 71 which, instead of being semi-circular as the lobes 60, 62, 65a and 65b, are formed with an opening of 270°.

The lobes 60, 62, 65a, 65b, 71 are made from special steel or preferably from stainless steel, their thickness being of the order of 1 mm. Likewise, the beams 61, 63 and 64 are made preferably of a special steel.

The beams 64a and 64b of the front face ABCD are connected with the homologous beams of the opposite front face A'B'C'D' by rigid vertical frames formed by girders or the like 66 arranged on both horizontal upper and lower faces, respectively, of the tank, and by vertical girders or the like 67 arranged on both front faces of the tank. These girders 66 and 67 consist of sectional U-shaped bars identical with the aforesaid beams, but directed so that the opening of the U faces inwards of the tank, so that the beams and the girders are in engagement with each other by their plane faces connecting both U-shaped flanges.

The beams 64a, 64b of a front face are connected in addition with the corresponding beams of the opposite front face by rigid horizontal frames formed by girders 68 located on both vertical faces AA'DD' and BB'CC' of the tank and by girders 69, arranged on the front walls of the tank. These girders 69 have a length which varies as a function of the length of the beams 64a.

Each one of the walls of the parallelepipedic tank is thus provided with beams and girders along two perpendicular directions and which thereby form a structure of a great stiffness.

Between two opposite parallel faces of the tank are provided stiffeners preferably arranged at the intersections between one beam and one girder.

The stiffeners between both upper and lower horizontal faces of the tank form pillars whereas the stiffeners between the opposite vertical faces ABCD, A'B'C'D' on the one hand, and AA'DD', BB'CC' on the other hand, form tension rods or the like. The tension rods are arranged so that the tension rods of perpendicular directions be not in a same plane but in overlying planes. Thus, for example, the tension rods parallel to the edge AA' may be disposed in horizontal planes of odd row number, whereas the tension rods which extend at right angles thereto and which therefore are parallel to the axis AB, are located in horizontal planes of even row number. Likewise, the pillars are preferably arranged so as they do not meet with the tension rods.

By mounting the lobes on beams forming a rigid frame, it is possible to use, for these lobes, steel sheets of very small thickness (for example stainless steel sheets having a thickness of about 1 mm.) thereby resulting in a considerable reduction in weight of these tanks with respect to conventional tanks.

The reduction in weight of the tank is advantageous in particular in the case of tanks adapted for the transportation by sea of liquefied gas, hence of tanks adapted to fit ships, since such a reduction in weight enables to manufacture said tanks on the shore and to mount them, once finished, on board ships through conventional handling means. It results therefrom a very substantial simplification of the manufacture of the tanks, the manufacture in a workshop being much easier, hence much less expensive, than the manufacture on board a ship. Moreover, the manufacture in a workshop enables to carry out the tightness tests much more easily and to remedy if need be the defects of manufacture.

On the other hand, the expansions and contractions which are undergone by the beams and girders on which are mounted the lobes, may take place without any inconvenience owing to the flexibility of these lobes which may follow these expansions and contractions.

It may be advantageous, in some cases, in particular in the case where the tank is adapted to the transportation by sea of liquefied gases to provide a medial partition which separates or divides the tank into two equal parts and thus forms an anti-roll partition bulkhead. It is therefore preferable that the number of cylindrical lobes on both horizontal faces and on both vertical faces ADA'D' and BCB'C' be odd, so that one of the frames constituted by the beams 61 and 63 be in the plane of symmetry of the tank. In this case, a frame filling, consisting of these beams, is provided so as to achieve such a partition bulkhead.

On FIGURE 20 has been shown a mode of supporting the tank according to the invention. The tank rests, by means of the beams 63 upon its lower face, on supports 75 comprising an angle bar 76 having a length which is preferably substantially equal to that of the beams 63 and the upper flat flange 76a of which is interposed between both vertical flanges of the beams 63. Between the flange 76a and the beams 63 is provided a plate 77 made of some resilient material and of thermally insulating character. Also are provided, below the flange 76a, resilient and thermally insulating plates 78 supported by webs or the like 79. The voids 80 left between the plates 77 and 78, may also be provided with an insulating deformable material which thereby provides a thermal continuous insulation.

The walls of the tank may also be connected to the hold of a ship for example, by means of spacers bearing upon the beams of its side-walls and of its upper wall, for example of spacers having a section similar or substantially similar to the aforesaid supports but which could have a length very much smaller than that of the beams upon which they are bearing. Between these spacers and the beams may also be provided insulating plates, made of any material, which is not required to withstand high pressures since the tank is self-supporting.

The tank may be provided with overlying lobes so as to provide a double wall. In this case, instead of the beams with U-shaped cross-section as previously described, beams 83 with an H-shaped section may be provided (FIGURE 21) both openings of which are directed, the one inwards and the other outwards of the tank. The double lobes 81, 82, for example cylindrical in shape, are then secured, as by welding upon each one of the two legs of the H. It is thus seen that when a leakage takes place, owing to a defect of welding in the inner lobe, such a leakage remains isolated between both overlying lobes and does not incur the risk of running over in the adjacent lobes.

It should be noted that the lobes, which constitute the walls of the tank, are particularly advantageous in the case of transportation by sea of liquefied gases. It is known that it is necessary, in the case of liquid methane for example, to leave a portion of the cargo load in the bottom of the tank during the return voyage to avoid that the tank take the ambient temperature. The presence of the lobes in the bottom of the tank enables to substantially reduce the required surface of liquid buoyancy.

According to the embodiment shown on FIGURE 22, two adjcent cylindrical lobes of any cross-sectional contour, such as 85, of a tank, the general shape of which may be any one whatever, are welded to a same connecting member consisting of a flat sheet or web 86, of a generally straight shape, located inside the tank. Along the inner edge of each one of these sheets or web 86 is welded a sectional bar or a structural beam 87 of square cross-sectional contour. The stiffeners consist of sectional bars or structural beams 88 identical with the sectional bars or the like 87, hence of square cross-sectional contour and distributed, in equally spaced relationship, along the sectional bars 87, said sectional bars 88 having both of their ends welded to the inner faces of the sectional bars 87. Thus a joining is achieved between the sectional bars 87 and 88 over a larger plane surface so that the stresses applied to the sectional bars 87 at the connecting places are not likely to exceed the breaking strength limit.

The sectional bars 87 and 88 are preferably made from steels having a high breaking-down limit, whereby enabling them to undergo without any fatigue very substantial forces.

Of course, the square cross-sectional contour that the sectional bars 87 and 88 are given is not at all compulsory and a polygonal cross-sectional contour may be given them, and these sectional bars may even be formed with differing cross-sectional contours.

The sectional bars of straight shape 88 may be replaced by annular members 89 as shown on FIGURE 23. These ring-shaped members 89, which are also preferably made from a steel with a high breaking-down limit, have a square cross-sectional contour and are welded to the sectional bars 87 at two diametrally opposed areas.

Between two sectional bars 87 may be provided several annular members 89, these latter being arranged in coaxial relationship.

It should be noted that the provision between the connecting sheets or webs 86 and the rings 89 of the sectional bars 87 enables to avoid that the rings tear away said sheets, as this would occur if there is a direct connection without interposition of said sectional bars 87.

Of course, the cross-sectional contour which the rings 89 are given, is not at all compulsory since any other shape of cross-sectional contour may also be used, the important thing consisting in reserving a plane outer surface for said rings to promote their connection by welding to the sectional bars 87.

The stiffeners may also consist of inner flat plates connected to the connecting sheets between two adjacent lobes or by providing extensions towards the inside and/or the outside of the tank, the planes of these plates converging towards each other so as to intersect.

In FIGURE 24 has been illustrated a tank of generally cylindrical shape, consisting of six cylindrical lobes 90 of circular cross-sectional contour, identical to each other and uniformly distributed, any two adjacent lobes being welded to a same plate or the like 91 which therefore forms the connecting element of these lobes. The planes of these plates intersect along the axis of revolution O of the tank. The plates 91 are themselves connected to each other by sheets 92 which are integral with each other and also form, in the area of convergence of the plates 91, an inner rigid structure of hexagonal cross-sectional contour, each one of these plates 91 being secured to one of the vertices of this hexagon.

The plates 91 may be solid or partially recessed or cut away. Moreover, the length of the plates 91 or, what amounts to the same thing, the length of the sheets 92 is selected at will so that the inner rigid structure, consisting of these sheets 92, may have any relative importance whatever with respect to the size of the tank. Also, the number of lobes 90, hence the number of sheets 92 may be any one whatever.

The attachment of each plate 91 to the sheets 92 may be achieved by welding, either by providing two welding seams on either side of the plate 91, or by providing a single welding seam between the three edges, this latter welding mode offering the advantage of keeping the symmetry of the sheet and, in addition, the advantage of avoiding a welding seam.

In FIGURE 25 has been illustrated a tank identical with that of FIGURE 24, the plates 91 being welded on the periphery of a rigid inner structure element which, instead of consisting of sheets welded to each other, is constituted by a cylinder, a hollow tube or the like 93. This embodiment is applicable to a tank consisting of any number whatever of lobes, and the diameter of the cylinder 93 may be so much smaller as the number of lobes is itself smaller.

On FIGURE 26 has been shown a tank similar to that of FIGURES 24 and 25, the rigid inner structure element consisting of a solid rod, a round iron or the like 94 on the periphery of which are welded the plates 91. This embodiment, applicable to tanks comprising a limited number of lobes, for instance less than eight, is particularly well suited to tanks having to undergo a high pressure.

It should at last be noted that the inner rigid structure element could consist for example of a series of coaxial rings, separated from each other, and this case besides corresponds to that shown on FIGURE 23, these rings being in addition preferably welded to the plates 91 through the medium of sectional bars similar to the sectional bars 86 of FIGURE 23 to prevent the plates of being torn away.

In FIGURE 27 has diagrammatically been illustrated a tank 101 accommodated with an enclosure constituted by the hold 100 of a ship. This tank consists of cylindrical lobes of circular cross-sectional contour, but of differing diameters 102, 103, 104, so that the cross-sectional contour admits a substantially rectangular envelope which enables to accommodate it within the hold 100 with a least loss of space. The stiffeners consist of plates 105, 106, 107, to which are connected two successive lobes. These plates extend on the one hand towards the inside of the tank where they are welded the ones to a solid rod 108, the others to a solid rod 109 connected to a rod 108 by a brace 110, and on the other hand towards the outside of the tank where they bear against abutments 111 integral with the walls of the hold. Any number whatever of rods such as 108 and 109 may be provided. The plates 105, 106 and 107, instead of bearing against abutments such as 111, could be welded to the structure of the hold. Finally plates 105, 106 and 107 could not extend towards the outside, the tank bearing upon the hold by means of its lobes.

Tanks of this type, owing to their capability of sustaining high pressures and due to their easy adaptation to the holds, enable to convert existing ships into conveyors of liquefied gases under high pressures and at a temperature about or equal to atmospheric temperature. It results therefrom, in addition to a maximum use of the space of the holds (about 90%) substantial savings in accommodation and operating costs since it is not necessary to charge the sheets of the ship with a view to withstand cold environment or to provide a cold-storage or refrigerating plant or installation on board ship.

It is obvious that a tank of the type described hereinabove could be used for storage on shore, the mode of construction being particularly well suited for the making of tanks of very large capacities.

The invention should of course not be constructed as being limited to the embodiments herein described and shown, which have only been given by way of examples.

What I claim is:

1. A closed container having a plurality of straight adjacent peripheral walls and two parallel straight end walls perpendicular to said peripheral walls, each wall comprising a plurality of successive adjacent lobes having in cross-section the shape of geometrically similar arcs of curves which are concave towards the inside of the container, connecting beams each having a substantially plane web member and flange means perpendicular to said web member, said connecting beams being so disposed that said web members are in a common plane and that said flange means project towards the outside of the container, the two lobes of each pair of successive lobes being tangentially connected along their side edges to said flange means, and stiffening beams each having a substantially plane web member and flange means perpendicular to said web member, said stiffening means having their web members registering with the web members of the aforesaid connecting beams and attached thereto, each connecting beam of a peripheral wall being parallel to said end walls and having its two ends attached to the ends of connecting beams of the adjacent peripheral walls so that any assembly of so-attached connecting beams forms a rigid peripheral frame, said frames being parallel to and spaced from each other and forming together a parallelepipedic external structure, each stiffening beam of a peripheral wall being perpendicular to the connecting beams in said peripheral wall and having its two ends attached to the ends of stiffening beams of said adjacent end walls so that any assembly of so-attached stiffening beams forms a rigid internal frame, said last-named frames forming together a parallelepipedic internal structure solid with said parallelepipedic external structure, the connecting beams of each one of said end walls being connected one to the other at their ends so as to form concentric polygons.

2. A container according to claim 1, wherein said stiffening beams have their concavity facing toward the inside of the container.

3. A container according to claim 1, further comprising support means comprising at least one flat flange adapted to be built inbetween said flanges of said connecting beams and bearing on said web member of said channel-like beams.

References Cited

UNITED STATES PATENTS

| 1,864,759 | 6/1932 | Pritchard. | |
| 1,864,931 | 6/1932 | Pritchard. | |
| 1,911,058 | 5/1933 | Bushnell. | |
| 2,618,401 | 11/1952 | Wilkin | 220—71 |
| 2,675,940 | 4/1954 | Schmitz | 220—71 |
| 2,818,191 | 12/1957 | Arne. | |
| 3,314,567 | 4/1967 | Becker et al. | 220—5 |

RAPHAEL H. SCHWARTZ, Primary Examiner

U.S. Cl. X.R.

220—1.5, 5